(12) United States Patent
    Galinier

(10) Patent No.: US 9,428,894 B2
(45) Date of Patent: Aug. 30, 2016

(54) METHOD FOR PRODUCING A VANITY UNIT ASSEMBLY AND VANITY UNIT ASSEMBLY OBTAINED BY THIS METHOD

(71) Applicant: Benoit Galinier, Albi (FR)
(72) Inventor: Benoit Galinier, Albi (FR)
(73) Assignee: CHENE VERT, Albi (FR)
( * ) Notice: Subject to any disclaimer, the term of this patent is extended or adjusted under 35 U.S.C. 154(b) by 265 days.
(21) Appl. No.: 14/377,053
(22) PCT Filed: Feb. 5, 2013
(86) PCT No.: PCT/FR2013/050241
    § 371 (c)(1),
    (2) Date: Aug. 6, 2014
(87) PCT Pub. No.: WO2013/117855
    PCT Pub. Date: Aug. 15, 2013
(65) Prior Publication Data
    US 2014/0345043 A1    Nov. 27, 2014
(30) Foreign Application Priority Data
    Feb. 7, 2012   (FR) ..................................... 12 00358
(51) Int. Cl.
    *E03C 1/33*      (2006.01)
    *A47B 77/06*     (2006.01)
    *B29C 45/14*     (2006.01)
    *E03C 1/18*      (2006.01)
    *B29L 31/00*     (2006.01)
    *B29L 31/44*     (2006.01)
    *B29K 101/12*    (2006.01)
(52) U.S. Cl.
    CPC ................. *E03C 1/33* (2013.01); *A47B 77/06* (2013.01); *B29C 45/1418* (2013.01);
    (Continued)
(58) Field of Classification Search
    CPC .................................. E03C 1/33; E03C 1/335
    USPC .............................. 4/632, 634, 635; 264/274
    See application file for complete search history.

(56) References Cited

U.S. PATENT DOCUMENTS 3,433,860 A * 3/1969 Ruggles ................... A47K 1/04
                                                  264/156
3,532,779 A * 10/1970 Wienand .................. B29C 51/14
                                                  156/322

(Continued)

FOREIGN PATENT DOCUMENTS

EP        1 114 715 A1     7/2001
EP        1 076 740 B1     3/2004

(Continued)

OTHER PUBLICATIONS

International Search Report, dated Aug. 7, 2013, from corresponding PCT application.

*Primary Examiner* — Huyen Le
(74) *Attorney, Agent, or Firm* — Young & Thompson

(57) ABSTRACT

Method for producing a vanity unit assembly, includes: making a cutout in a receiving surface, leaving behind an edge made from a laminated layer overhanging the inside of the cutout; making, from a thin sheet of thermoplastic synthetic material(s), called the decorative film, a preform of the basin including a rim that is planar along the periphery thereof, towards the outside of the preform, the rim having a width smaller than the width of the laminated layer edge; installing the preform and the receiving surface in the mould so that the preform is inserted into the cutout formed in the support material and the planar rim of the preform comes into contact with the laminated layer edge; closing the mould and injecting a second thermoplastic synthetic material, between the concave shell and the preform. A vanity unit wherein the basin is flush with the receiving surface is also described.

15 Claims, 3 Drawing Sheets

(52) U.S. Cl.
CPC .. *B29C 45/14467* (2013.01); *B29C 45/14778* (2013.01); *B29C 45/14811* (2013.01); *E03C 1/18* (2013.01); *B29C 2045/14213* (2013.01); *B29C 2045/14237* (2013.01); *B29K 2101/12* (2013.01); *B29L 2031/441* (2013.01); *B29L 2031/7698* (2013.01)

(56) References Cited

U.S. PATENT DOCUMENTS

| | | | | |
|---|---|---|---|---|
| 3,736,201 | A | * | 5/1973 | Teraoka .............. B29C 49/0031 156/145 |
| 5,218,013 | A | * | 6/1993 | Schock ................... B29C 43/02 523/209 |
| 5,683,638 | A | * | 11/1997 | Crigler ................ B29C 37/0082 264/162 |
| 6,000,673 | A | | 12/1999 | Bordener |
| 6,311,345 | B1 | | 11/2001 | Limbach |
| 2010/0175182 | A1 | | 7/2010 | Konno et al. |
| 2012/0073042 | A1 | | 3/2012 | Galinier |

FOREIGN PATENT DOCUMENTS

| | | |
|---|---|---|
| EP | 2 338 672 A2 | 6/2011 |
| FR | 2 962 459 A1 | 1/2012 |
| JP | 53 077760 A | 7/1978 |
| JP | 53 143470 A | 12/1978 |
| JP | 54 150483 A | 11/1979 |

* cited by examiner

METHOD FOR PRODUCING A VANITY UNIT ASSEMBLY AND VANITY UNIT ASSEMBLY OBTAINED BY THIS METHOD

The invention relates to a method for producing a monobloc vanity unit assembly comprising a basin integrated into a receiving surface, in particular a sanitary surface or a work surface of a bathroom or kitchen. The invention also extends to a vanity unit assembly obtained by this method.

Pieces of bathroom or kitchen furniture possess an upper panel forming a sanitary or work surface, called the receiving surface in the rest of the description, in which a basin, generally a sink- or wash-basin, is embedded. This receiving surface can be formed by a support material such as pressed wood for example, clad with a covering such as a thin layer of laminated material, in which an opening or cutout is made to make space for the basin.

There exist various techniques suitable for enabling integration of a basin into such a receiving surface, in particular when the basin is to be mounted flush with the upper face of the receiving surface.

With a view to making the description clearer, it will be assumed, throughout the following, that the receiving surface and basin are in their normal position of use, the terms "top", "bottom", "upper", "lower" referring to this position, irrespective of the actual position of the receiving surface and the basin during the steps of the manufacturing method.

There is known, for example from the patent EP1076740, a technique for integrating the basin into the receiving surface by manual adjustment and adhesive bonding of the basin on the surface.

To avoid all the manual adjustment operations and the waiting times necessary in this method, French patent application FR2962459 proposes a method in which the basin is molded onto the edge of the cutout in a mold adapted to produce the flushing of the basin with the upper face of the receiving surface.

Although this method enables a considerable saving for the production of a basin flush with the receiving surface, it has the disadvantage of requiring a plain basin color (color of the injected thermoplastic synthetic material). Moreover, to obtain certain surface characteristics of the basin such as resistance to scratching, abrasion and chemical products, it is necessary to use materials which are costly and/or difficult to implement.

The present invention proposes to overcome the disadvantages of the known prior art described above by making it possible to obtain vanity unit assemblies comprising a basin flush with the upper face of the receiving surface and having esthetic or technical surface characteristics which are difficult or even impossible to obtain by the methods of the prior art.

To achieve this, the invention relates to a method for producing a vanity unit assembly, in which:
- a cutout is made in a receiving surface comprising a thick layer of a support material covered on at least one face with a thin layer of laminated material, called the laminated layer, said cutout being made in the support material according to a contour of a basin and leaving a border of the laminated layer overhanging toward the inside of the cutout,
- an injection mold is used, comprising two parts of complementary shape, a first part, called the concave shell, comprising at least one recessed part suitable for forming a convex outer surface of the basin and a second part, called the convex shell suitable for forming a concave inner surface of the basin, said mold being adapted to receive and clamp the receiving surface between the two shells, the laminated layer of the receiving surface facing the convex shell, wherein:
- a preform of the basin is made from a thin sheet of thermoplastic synthetic material(s), called the decorative film, the preform comprising a planar rim along its contour, toward the outside of the preform, said rim having a width smaller than the width of the border of the laminated layer,
- the preform and the receiving surface are installed in the mold in the following order: concave shell, preform, receiving surface, convex shell, so that the preform is inserted into the cutout formed in the support material and that the planar rim of the preform comes into contact with the border of the laminated layer,
- the mold is closed and a second thermoplastic synthetic material, called the injected material, is injected between the concave shell and the preform.

During the injection of the second thermoplastic material, for example acrylonitrile butadiene styrene or ABS, between the concave shell and the preform, the latter is softened by the temperature of the injected material and pressed against the convex shell by the injection pressure. The preform then takes the exact shape of the convex shell. Furthermore, the rim of the preform comes into contact with the border of the laminated material and is deformed, at the part of the rim not covered by the border, in the direction of the convex shell to become flush with the upper level of the receiving surface. It is thus possible, even with an approximate preform, to obtain the exact shape desired for the inside of the basin and also perfect flushing of the rim of the basin with the laminated layer. The preform used thus makes it possible, depending on the choice of the material of the decorative film, to obtain a decoration and/or mechanical surface properties which would not be easy to obtain by the injection of the second thermoplastic material alone.

Advantageously and according to the invention, a decorative film is employed which is formed by a sheet comprising at least two layers of thermoplastic synthetic materials, at least a first layer of which is formed by a transparent material. Preferably, the decorative film comprises a first layer of a transparent material such as polymethyl methacrylate (PMMA), having a thickness of between 0.05 mm and 0.1 mm, preferably 0.07 mm. Methyl methacrylate particularly in its form as an extruded and/or calendered film has scratch and abrasion resistance properties which are particularly suitable for the production of basins. The methyl methacrylate layer can also receive a specific surface treatment allowing it to withstand the main forms of chemical attack to which a basin may be subjected in use.

Advantageously and according to the invention, a decorative film is employed which comprises a second layer of thermoplastic synthetic material, having characteristics compatible with the injected material. In particular, the second layer of thermoplastic synthetic material, having a thickness of between 0.5 mm and 1 mm and preferably 0.6 mm, is chosen to ensure, during the injection, compatibility of the temperatures between the injected material and the decorative film enabling a controlled deformation of the latter and, after injection, excellent cohesion between the injected material and the film. For example, for an injected material such as ABS, PETG or PMMA, the choice of a second layer made of ABS, the melting and/or glass transition temperature of which is close to those of the aforementioned materials, is a good compromise between the ease of thermoforming of the decorative film and its resistance during the molding of the basin. This second layer of thermoplastic synthetic material is joined by any known means, for example by colamination or by adhesive bonding, to the first layer to form the decorative film.

Advantageously and according to the invention, the first layer of the decorative film comprises a preprinted decoration on its face facing the second layer. It is thus possible to obtain a decorative film having a decoration protected by the first transparent layer on the visible side of the decorative film, and by the second layer whose function is to prevent the migration of the injected thermoplastic material toward the decoration during the plastic injection process in order to avoid deterioration of the decoration. It is thus possible to obtain a basin having varied colors or decorations which could not be obtained simply by the injection of a thermoplastic material.

Advantageously and according to the invention, the preform is produced by thermoforming of a decorative film having a thickness of between 0.5 mm and 1.5 mm. By using a decorative film with a thickness substantially equivalent to the thickness of the laminated layer, comprising for example a layer of transparent PMMA of 0.07 mm and a layer of ABS of 0.6 mm, a good compromise is achieved between the ease of thermoforming, the perforation resistance during the injection of the second thermoplastic synthetic material and the adjustment of the rim of the preform on the border of the laminated layer.

Advantageously and according to the invention, the thermoforming of the preform is performed in the injection mold before installation of the receiving surface. It is indeed possible to perform the thermoforming of the decorative film directly in the injection mold, for example by suction in the concave shell after preheating it for example by infrared radiation. Thus, the preform can be produced in the same tools which will be subsequently used for the injection. Even if the preform has a difference in shape with respect to the upper face of the basin which it is to form, its malleability under the effect of the pressure and the temperature of the second injected thermoplastic synthetic material allows it to be pressed tightly against the convex shell during the injection step.

Advantageously and according to a preferred embodiment of the invention, the thermoforming is performed on a specialized thermoforming machine and the preform is then introduced into the injection mold between the concave shell and the receiving surface. In this preferred version of the method according to the invention, the preform is produced on a thermoforming machine separate from the injection mold. This method is more economical owing to the production of the preforms concurrently, on a specialized machine making it possible to obtain more efficient manufacturing tolerances.

Advantageously and according to the invention, the rim of the preform comprises radial tabs extending in the plane of the rim, evenly distributed over the contour of the preform, and of a length adapted to come into contact with the edge of the cutout of the receiving surface. Preferably, their length is substantially equal to half the width of the border of the laminated layer of the receiving surface. By virtue of these tabs, the centering of the preform in the cutout is facilitated. Furthermore, they make it possible to adjust the overlap between the border of the laminated layer and the rim of the preform so as to provide an uncovered area allowing, during the injection, a direct contact area to be produced between the injected material and the border in order to improve the sealing between the basin and the receiving surface. Preferably, the tabs are of triangular shape so as to minimize the discontinuities of this direct contact area.

Advantageously and according to the invention, the cutout is made in the receiving surface in such a way that the edge of the cutout has an inclination of five to fifteen degrees and preferably of ten degrees toward the outside of the contour starting from the laminated layer. This inclination of the edge of the cutout makes it possible to engage the preform without difficulty in the receiving surface and to form a peripheral skirt along the cutout ensuring the holding of the basin thereon.

Advantageously and according to the invention, the cutout leaves a border of the laminated layer having a width of three to ten millimeters and preferably of five millimeters. The width of the border of the laminated layer is adapted to enable an overlap of the rim of the preform sufficient to prevent, during the injection step, any leakage of the second thermoplastic synthetic material between the rim of the preform and the border of the laminated layer while retaining a strip of contact of the second thermoplastic synthetic material with the border of the laminated layer over the entire periphery of the basin in order to guarantee the sealing between the latter and the receiving surface.

Advantageously and according to the invention, the cutout made in the receiving surface has a depth adapted to eliminate any trace of support material on the border of the laminated layer. In this way, the rim of the preform comes into close contact with the laminated layer without interposition of particles of the support material, thus enabling a good seal to be achieved between the preform and the border of the laminated layer.

Advantageously and according to the invention, after the cutting-out operation, there is performed an operation for application of a sealing product to the border of the laminated layer and the edge of the cutout. Preferably, the sealing product is a composition enabling adhesive bonding of the rim of the preform to the border of the laminated layer. This operation enables further improvement of the seal between the receiving surface and the basin.

Furthermore, after the cutting-out step and before spraying the sealing product, an operation for blowing and dedusting the receiving surface is performed. By passing the receiving surfaces into a booth for blowing and suction of dust after the cutting-out, any contamination of the subsequent operations by the cutting-out residues is avoided.

Advantageously and according to the invention, the preform is installed in the concave shell, the receiving surface is installed above the preform and upon the closure of the injection mold, the preform is pressed against the convex shell by suction through suction channels formed in the convex shell and this suction is maintained during the injection of the thermoplastic material between the preform and the concave shell. During the installation of the preform in the injection mold, it is necessary to place it in the concave shell in order to cover it by the receiving surface before closing the mold so that the rim of the preform is placed below the border of the laminated layer. The suction produced by the suction channels of the convex shell enables the rim of the preform to be pressed against the border.

Advantageously, in a variant of the method according to the invention, the preform is fixed to the receiving surface before installation of the latter in the mold. This fixing can be performed simply by inserting with force the tabs formed on the contour of the rim of the preform into the cutout or, alternatively or in combination, by adhesive bonding of the rim of the preform to the inner part of the border of the receiving surface. In this variant of the method according to the invention, advantage is taken of the handling of the receiving surface to install the preform directly in the cutout thereof, in contact with the border of the laminated layer and, as appropriate, to adhesively bond it directly to the border by a few spots of adhesive. This variant thus makes it possible to dispense with the production of complex suction in the convex shell.

The invention also extends to a monobloc assembly, called the vanity unit, comprising:

a receiving surface comprising a thick layer of a support material covered on at least one face with a thin layer of laminated material, called the laminated layer;

a basin molded onto the edge of a cutout formed in the receiving surface, wherein said basin comprises at least one first surface layer, called the preform, of at least one first thermoplastic synthetic material flush with the laminated layer of the receiving surface, and a second layer, called the injected layer, of a second thermoplastic synthetic material supporting the preform and anchored in the edge of the cutout of the receiving surface.

Such a monobloc assembly comprising a basin having a surface "skin" makes it possible to provide a decorated basin flush with the receiving surface with unmatched esthetic and robustness properties at a reasonable cost.

The invention also relates to a method for producing a vanity unit assembly and to a vanity unit assembly characterized in combination by all or some of the features mentioned above or below.

Other objects, features and advantages of the invention will become apparent from the following description and the appended drawings in which.

Figure 1:
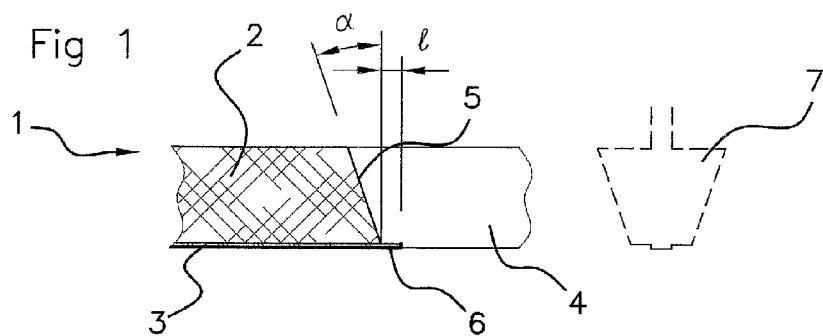
FIG. 1 shows a section of the receiving surface after machining of the cutout.
Figure 6:
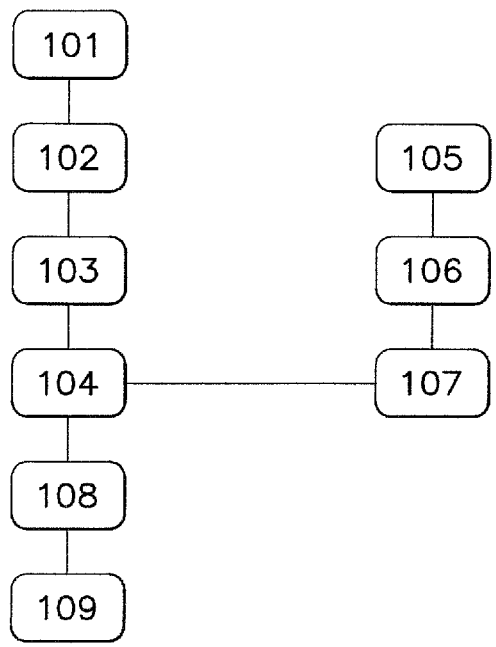
FIG. 6 shows a flow chart of a preferred variant of the method according to the invention.

Reference is made to FIG. 6 to describe in general the method for producing a vanity unit assembly according to the invention:

In a first step 101, the result of which is shown in detail in FIG. 1, a cutout of the contour of a basin 18 is made in a receiving surface 1 and also, as appropriate, other cutouts such as the passage for the faucets etc. The receiving surface 1 is formed by a support material 2, for example a pressed-wood panel covered with a thin layer 3 of laminated material. During step 101, the receiving surface is clamped on a numerically controlled machine, with the laminated layer 3 at the bottom, so as to enable a cutout 4 to be made by means of a milling cutter 7. The milling cutter 7 is chosen so as to enable the entire thickness of the support material 2 to be cut out while leaving a border 6 of the laminated layer 3. The edge 5 of the cutout has an inclination α of 5 to 15° relative to the vertical so as to form a flared cutout opposite the border 6. Preferably, the inclination of the edge of the cutout is 10° toward the outside of the contour starting from the laminated layer 3, this inclination value being optimal for holding the molded-on basin. Advantageously, the border 6 of the laminated layer 3 has a width l of 3 to 10 mm, and preferably of 5 mm. The displacement of the milling cutter 7 is controlled in depth so as to eliminate any trace of support material 2 on the border 6 of the laminated layer.

The next step 102 consists of dedusting the machined receiving surface in a blowing/suction booth.

In step 103, a sealing product is applied, by spraying for example, to the edge 5 of the cutout 4, and more particularly to the part of the edge joining the border 6 as well as to the border itself. This sealing product may be, for example, an adhesive composition of the epoxy or polyurethane type suitable for preserving adhesive properties up to polymerization under heat so as to enable, in a subsequent operation, the adhesive bonding of the rim of the preform to the border 6. It is also possible to use an application of a thin layer of hot-melt adhesive, either applied directly under heat, or in the form of a dispersion of particles of hot-melt adhesive in a binder. A polymerization temperature (or melting temperature in the case of a hot-melt adhesive) of the same order as the temperature reached during the injection, i.e. of the order of 230° C., is preferably chosen, so that this layer of adhesive ensures the sealing between the receiving surface and the moulded-on basin.

Figure 7:
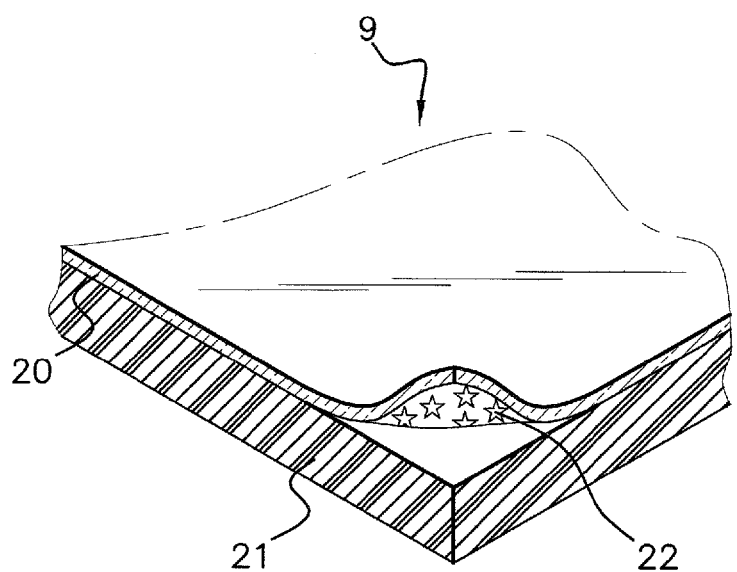
FIG. 7 shows a sectional perspective view of a decorative film used in the method according to the invention.

In parallel with the steps for preparation of the receiving surface, in step 105 the thermoforming of a preform 10 of the basin from a multilayer sheet of synthetic thermoplastic materials or decorative film 9 is performed. This thermoforming step is schematically shown in FIG. 2 and the structure of the decorative film 9 employed is shown in FIG. 7.

The decorative film 9 is formed by a first layer 20 of transparent synthetic material such as PMMA (polymethyl methacrylate) of very small thickness, for example between 0.05 mm and 0.1 mm, preferably 0.07 mm. This first layer 20 is joined to a second layer 21 of a second thermoplastic synthetic material, with a thickness between 0.5 mm and 1 mm, preferably 0.6 mm, by adhesive bonding, colaminating or any other method within the scope of a person skilled in the art. The first layer 20 has on its face in contact with the second layer 21 a preprinted decoration 22. Such decorative films are marketed for example by the company PROTECHNIC under the brand HELIOPLAST or by the Japanese company NISSHA.

Advantageously, the choice of material of the second layer is made according to its compatibility with the thermoplastic material provided for the injection of the basin. Thus, if the material chosen for the injection is ABS for example, ABS will be chosen for the second layer 21. Similarly, for an injected material such as PMMA or PETG, the melting temperatures of which are of the order of 200° C. to 250° C., it was found that the second layer 21 made of ABS allowed the deformation of the decorative film 9 without degradation of the decoration 22 (no piercing of the layer 21).

Figure 2:
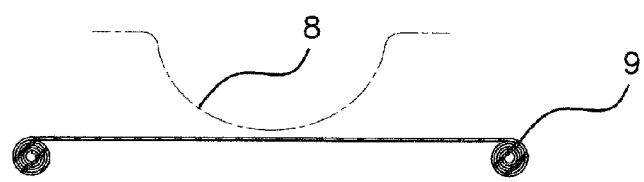
FIG. 2 shows schematically the thermoforming of the decorative film to obtain the preform.
Figure 2:

In step 105, a preform 10 of the basin is produced for example by draping a preheated decorative film 9, in the form of a roll, around a projecting mold (positive mold) as shown in FIG. 2, or by sucking it onto a recessed mold (negative mold). Preferably, a specialized thermoforming machine is used which allows faster mold changes and uses molds less costly than injection molding machines. It is, however, possible to use the molds intended for the injection of the basin to produce the preform 10, as will be seen below. The decorative film 9 is placed in such a way that the transparent PMMA layer is oriented toward the top of the basin, that is to say it forms the surface of the inside thereof.

The shape of the thermoforming mold is substantially identical to the inner shape of the basin for the concave part thereof, and comprises means for forming a planar rim 11 along the contour thereof and extending toward the outside of the concave part.

Once the decorative film 9 has been thermoformed, the preform 10 is cut out in step 106 in such a way that the width of the rim 11 allows the insertion of the preform inside the cutout 4 formed in the receiving surface 1 so that the rim comes into contact with the lower face of the border 6 of the laminated layer. Preferably, the width of the rim 11 is such that once the preform 10 has been centered in the cutout 4, the end of the rim 11 rests on the border 6 over a strip with a width of at least 2 mm while leaving free and uncovered a peripheral area of the border 6 of the order of 1 to 3 mm.

Figure 3:
FIG. 3 is a schematic top view of the preform according to the invention.
Figure 3:
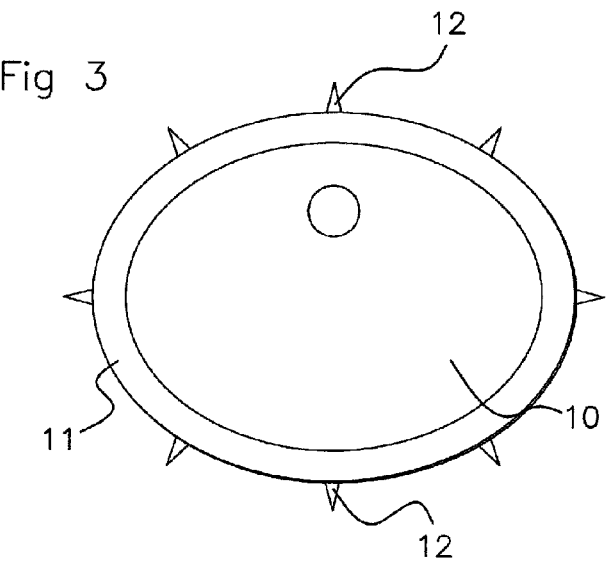

Advantageously, when cutting out the rim of the preform, radial tabs 12 (FIG. 3) are formed which extend in the plane and toward the outside of the rim 11, and are evenly distributed over the contour of the preform 10. The radial tabs 12 have a triangular shape and a length adapted to at least come into contact with the edge of the cutout of the receiving surface, for example of the order of 0.5 mm greater than the width length of the peripheral area of the border 6 not covered by the rim 11. Thus, on insertion of the preform 10 into the cutout 4 of the receiving surface 1, the radial tabs 12 enable the preform to be centered in the cutout and temporarily fixed in this position by interference.

The preform 10 thus formed and cut out is then stored in step 107 while awaiting use in step 104.

In step 104, the receiving surface 1 resulting from the sealing coating step 103 is associated with a preform 10 corresponding to the cutout made in the receiving surface. More particularly, the receiving surface 1 is grasped by a manipulator arm to be subsequently positioned in the mold (in step 108). During this manipulation, the receiving surface is presented to the operator in a position allowing easy insertion of the preform into the cutout, for example with the face of the support material of the receiving surface facing the operator. The operator then engages the preform 10 in the cutout, the flared opening of which faces him, the rim 11 of the preform entering the cutout first. Owing to the radial tabs 12, the centering of the preform in the cutout is facilitated. The preform 10 is temporarily fixed in the receiving surface by at least one of the following means: i) the adhesiveness of the layer of adhesive deposited in step 103 or, in the case of a layer of hot-melt adhesive, a heating thereof by an infrared strip heater for example; ii) the radial tabs 12 which may also serve for fixing the preform in the receiving surface by deforming elastically, or else by the operator who applies spots of adhesive evenly distributed over the periphery of the rim 11, astride the rim and the border 6. Once the preform has been installed in the receiving surface 1, the manipulator arm continues its travel to position the receiving surface in the injection mold in step 108.

In a variant of the method of the invention, the step 104 of mounting the preform in the receiving surface is combined with the step 108 of loading the mold. In this case, the operator inserts the preform 10 into the concave shell 14 of the mold, where it is held by suction through suction channels formed in the concave shell. In this variant, it may be envisaged to benefit from the suction means present on the shells 13 and 14 of the mold for producing the preform 10 by using these. For example, it is possible to stretch the decorative film 9 above the concave shell 14, to heat it for example by means of an infrared strip heater, then to apply it by suction to the surface of the concave shell. Once the decorative film 9 has been thermoformed in the concave shell, it can be cut out, for example, by a cutting frame pressed over the concave shell.

The operator then positions the receiving surface 1 above the concave shell 14, with the face of the support material of the receiving plane facing the concave shell. The convex shell 13 then closes the mold, gripping the receiving surface 1 between the two shells. The suction for holding the preform in the concave shell is then stopped and suction via suction channels formed in the convex shell 13 is then started. The preform 10 is thus sucked and pressed against the convex shell 13, the rim 11 of the preform coming into contact with the border 6 of the laminated layer of the receiving surface.

Figure 4:
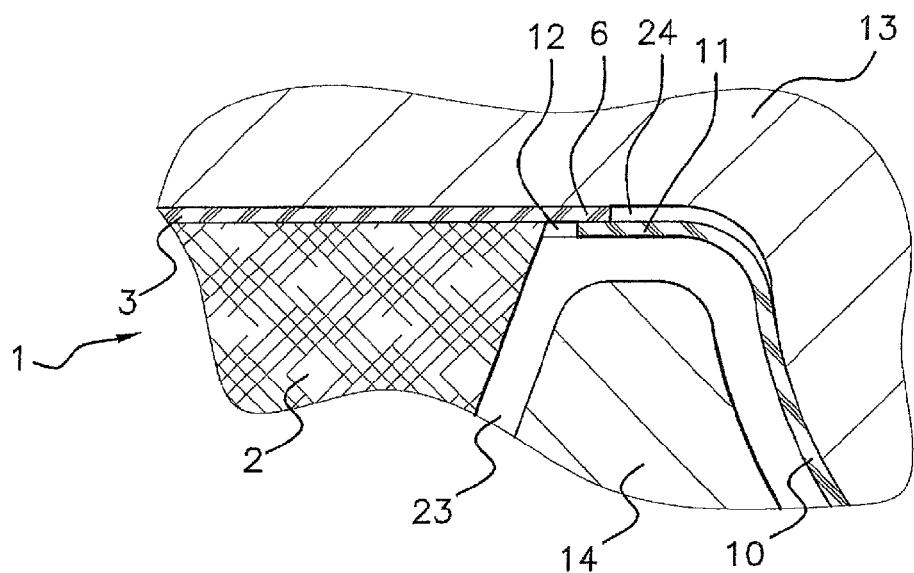
FIG. 4 shows the installation of the receiving surface and of the preform in the injection mold.

Regardless of the variant of the method, at the end of the step 108 of loading the mold, the receiving surface 1 and the preform 10 are situated in the position illustrated in FIG. 4. The concave part of the preform 10 is pressed against the convex shell 13, the rim 11 of the preform is pressed against the border 6 of the layer 3 with, as appropriate, the radial tab 12 coming into contact with the support material 2. It is thus noted that there remains after closing the mold a first empty space 23 between the concave shell 14 and the preform 10 and a second empty space 24 between the rim 11 and the convex shell 13, corresponding to the thickness of the border 6 of the laminated layer 3.

During the step 109 of injection of a thermoplastic synthetic material in the molten state into the first empty space 23, the injected material 15, preferably ABS, softens the preform 10 and presses it tightly against the convex shell 13. The rim 11 of the preform 10 conforms to the shape of the border 6 and fills the empty space 24 under the pressure of the injected material. In addition, under the combined action of the injection pressure and temperature, the sealing product applied in step 103 adhesively bonds the rim of the preform to the border 6 and helps to form a sealed joint at the interface between the border 6 and the injected material 15.

Figure 5:
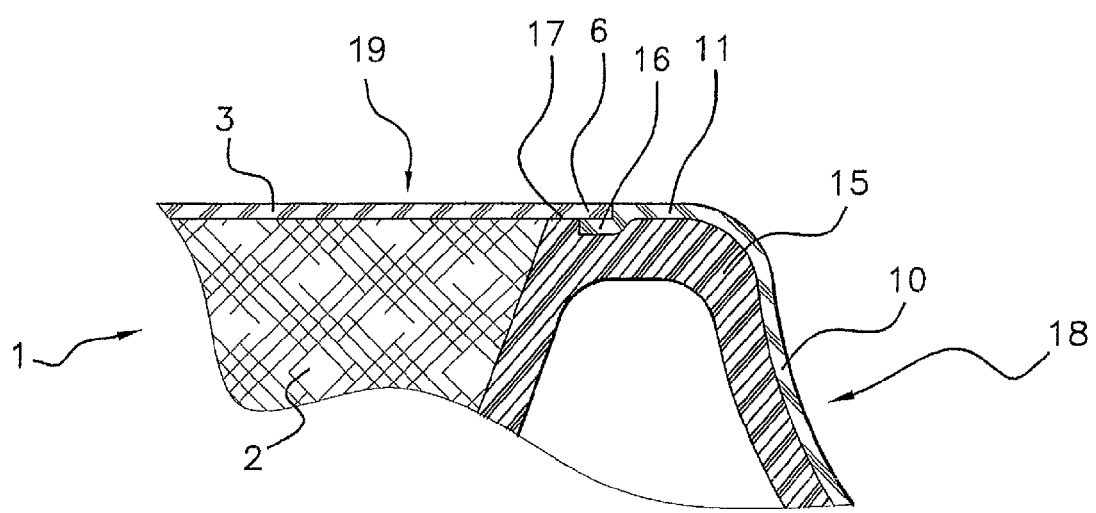
FIG. 5 is a detail view, in section, of the vanity unit assembly at the junction of the basin and the receiving surface.

In FIG. 5 there is shown a partial section of a finished vanity unit assembly 19 at the interface between the basin 18 and the receiving surface 1. It can thus be seen that after the injection step 109, the injected material 15 has filled the empty space 23. The rim 11 of the preform 10 has been deformed to come into contact with the convex shell 13. Therefore, a large part of this rim 11 is in continuity with the laminated layer 3 thus forming a basin 18 flush with the receiving surface 1. The rest of the rim 11 forms an offset 16 below the border of the laminated layer, while nevertheless forming a contact area 17 between the border 6 and the injected material 15. This contact area 17 makes it possible to produce an excellent seal between the basin 18 and the receiving surface 1.

Of course, this description is given by way of illustration only and a person skilled in the art may make numerous modifications without departing from the scope of the invention, such as for example adding some intermediate operations such as drilling, labeling, packaging, etc.

The invention claimed is:

1. Method for producing a vanity unit assembly (19), in which:
   a cutout (4) is made in a receiving surface (1) comprising a thick layer of a support material (2) covered on at least one face with a thin layer of laminated material, called the laminated layer (3), said cutout being made in the support material according to a contour of a basin and leaving a border (6) of the laminated layer overhanging toward the inside of the cutout, an injection mold is used, comprising two parts of complementary shape, a first part, called the concave shell (14), comprising at least one recessed part suitable for forming a convex outer surface of the basin and a second part, called the convex shell (13) suitable for forming a concave inner surface of the basin, said mold being adapted to receive and clamp the receiving surface (1) between the two shells, the laminated layer (3) of the receiving surface facing the convex shell (13), wherein:

a preform (10) of the basin is made from a thin sheet of thermoplastic synthetic material(s), called the decorative film (9), the preform comprising a planar rim (11) along its contour, toward the outside of the preform, said rim having a width smaller than the width of the border (6) of the laminated layer, the preform (10) and the receiving surface are installed in the mold in the following order: concave shell (14), preform (10), receiving surface (1), convex shell (13), so that the preform is inserted into the cutout (4) formed in the support material and that the planar rim (11) of the preform comes into contact with the border (6) of the laminated layer, the mold is closed and a second thermoplastic synthetic material, called the injected material (15), is injected between the concave shell and the preform.

2. Method as claimed in claim 1, wherein a decorative film (9) is employed which is formed by a sheet comprising at least two layers of thermoplastic synthetic materials, at least a first layer (20) of which is formed by a transparent material.

3. Method as claimed in claim 2, wherein a decorative film (9) is employed which comprises a second layer (21) of thermoplastic synthetic material made of the same material as the injected material (15).

4. Method as claimed in claim 3, wherein the first layer (20) comprises a preprinted decoration (22) on its face facing the second layer (21).

5. Method as claimed in claim 2, wherein the first layer (20) comprises a preprinted decoration (22) on its face facing the second layer (21).

6. Method as claimed in claim 1, wherein the preform (10) is produced by thermoforming of a decorative film (9) having a thickness of between 0.5 and 1.5 millimeters.

7. Method as claimed in claim 6, wherein the thermoforming is performed in the injection mold before installation of the receiving surface (1).

8. Method as claimed in claim 1, wherein the rim (11) of the preform (10) comprises radial tabs (12) extending in the plane of the rim, evenly distributed over the contour of the preform, and of a length adapted to come into contact with the edge (5) of the cutout (4) of the receiving surface.

9. Method as claimed in claim 1, wherein the cutout (4) is made in the receiving surface in such a way that the edge (5) of the cutout has an inclination ($\alpha$) of five to fifteen degrees and preferably of ten degrees toward the outside of the contour starting from the laminated layer (3).

10. Method as claimed in claim 1, wherein the cutout leaves a border (6) of the laminated layer having a width of three to ten millimeters and preferably of five millimeters.

11. Method as claimed in claim 1, wherein the cutout (4) made in the receiving surface (1) has a depth adapted to eliminate any trace of support material (2) on the border (6) of the laminated layer (3).

12. Method as claimed in claim 1, wherein, after the cutting-out operation (101), there is performed an operation for application (103) of a sealing product to the border of the laminated layer and the edge (5) of the cutout.

13. Method as claimed in claim 1, wherein the preform (10) is installed in the concave shell (14), the receiving surface (1) is installed above the preform and upon the closure of the injection mold, the preform is pressed against the convex shell (13) by suction through suction channels formed in the convex shell and this suction is maintained during the injection of the thermoplastic material between the preform (10) and the concave shell (14).

14. Method as claimed in claim 1, wherein the preform (10) is fixed to the receiving surface (1) before installation of the latter in the mold.

15. Monobloc assembly, called a vanity unit (19), comprising:

a receiving surface (1) comprising a thick layer of a support material (2) covered on at least one face with a thin layer of laminated material, called the laminated layer (3);

a basin (18) molded onto an edge (5) of a cutout (4) formed in the receiving surface, wherein said basin comprises at least one first surface layer, called the preform (10), of at least one first thermoplastic synthetic material flush with the laminated layer (3) of the receiving surface, and a second layer of a second thermoplastic synthetic material, called the injected material (15), supporting the preform (10) and anchored in the edge (5) of the cutout of the receiving surface.

* * * * *